(12) United States Patent
Kanenobu et al.

(10) Patent No.: US 6,199,441 B1
(45) Date of Patent: Mar. 13, 2001

(54) FLUID SUPPLY SYSTEM IN VEHICLES

(75) Inventors: Hideki Kanenobu, Ashiya; Jiro Shibata, Amagasaki, both of (JP)

(73) Assignee: Kanzaki Kokyukoki Mfg. Co. (JP)

( * ) Notice: Subject to any disclaimer, the term of this patent is extended or adjusted under 35 U.S.C. 154(b) by 0 days.

(21) Appl. No.: 09/426,661

(22) Filed: Oct. 25, 1999

(30) Foreign Application Priority Data

Dec. 22, 1998 (JP) .................................................. 10-376299

(51) Int. Cl.[7] .............................. F16H 3/08; F01M 1/16; F16D 13/74
(52) U.S. Cl. ...................... 74/331; 184/6.12; 192/87.13; 192/113.35
(58) Field of Search ............................... 192/3.51, 87.13, 192/87.18, 113.3, 113.34, 113.35; 74/331, 325, 330; 184/6.12

(56) References Cited

U.S. PATENT DOCUMENTS

| 5,599,247 | 2/1997 | Matsufuji | 475/128 |
| 5,669,479 | * 9/1997 | Matsufuji | 184/6.12 X |
| 5,690,001 | * 11/1997 | Matsufuji | 74/335 X |
| 6,044,720 | * 4/2000 | Matsufuji | 74/331 |

FOREIGN PATENT DOCUMENTS 1-199034    8/1989  (JP) .
8-20257     1/1996  (JP) .

* cited by examiner

Primary Examiner—Rodney H Bonck

(57) ABSTRACT

In a vehicle wherein a supplementary speed change mechanism (12; 112) having selectively operable two fluid-operated clutches (29F, 29R; 129L, 129H) and a main speed change mechanism (15; 18) having selectively operable plural fluid-operated clutches (36, 37, 38; 45, 46, 47) are connected in series, and wherein fluid pressure applied to the clutches of supplementary speed change mechanism is once reduced in response to the shifting operation of main speed change mechanism, a flow control valve (50) is connected to an output flow path (49) of a pump (49) for dividing its inflow into a constant flow and a surplus flow. A flow divider valve (52; 52A) is provided for dividing the constant flow into two flows of a constant ratio one of which is supplied to the clutches of main speed change mechanism and the other of which is supplied to the clutches of supplementary speed change mechanism. The surplus flow is used as lubricant supplied to the clutches of supplementary speed change mechanism. In another embodiment employed in a vehicle comprising a supplementary speed change mechanism (12) having selectively operable two fluid-operated clutches (29F, 29R) each of which is selectively brought into a slippingly engaged condition by a pressure-reducing valve (59), fluid relieved from a relief valve (211, 212, 213) for determining fluid pressure applied to another fluid-operated device (203, 206) is joined to lubricant for the cluthes.

8 Claims, 7 Drawing Sheets

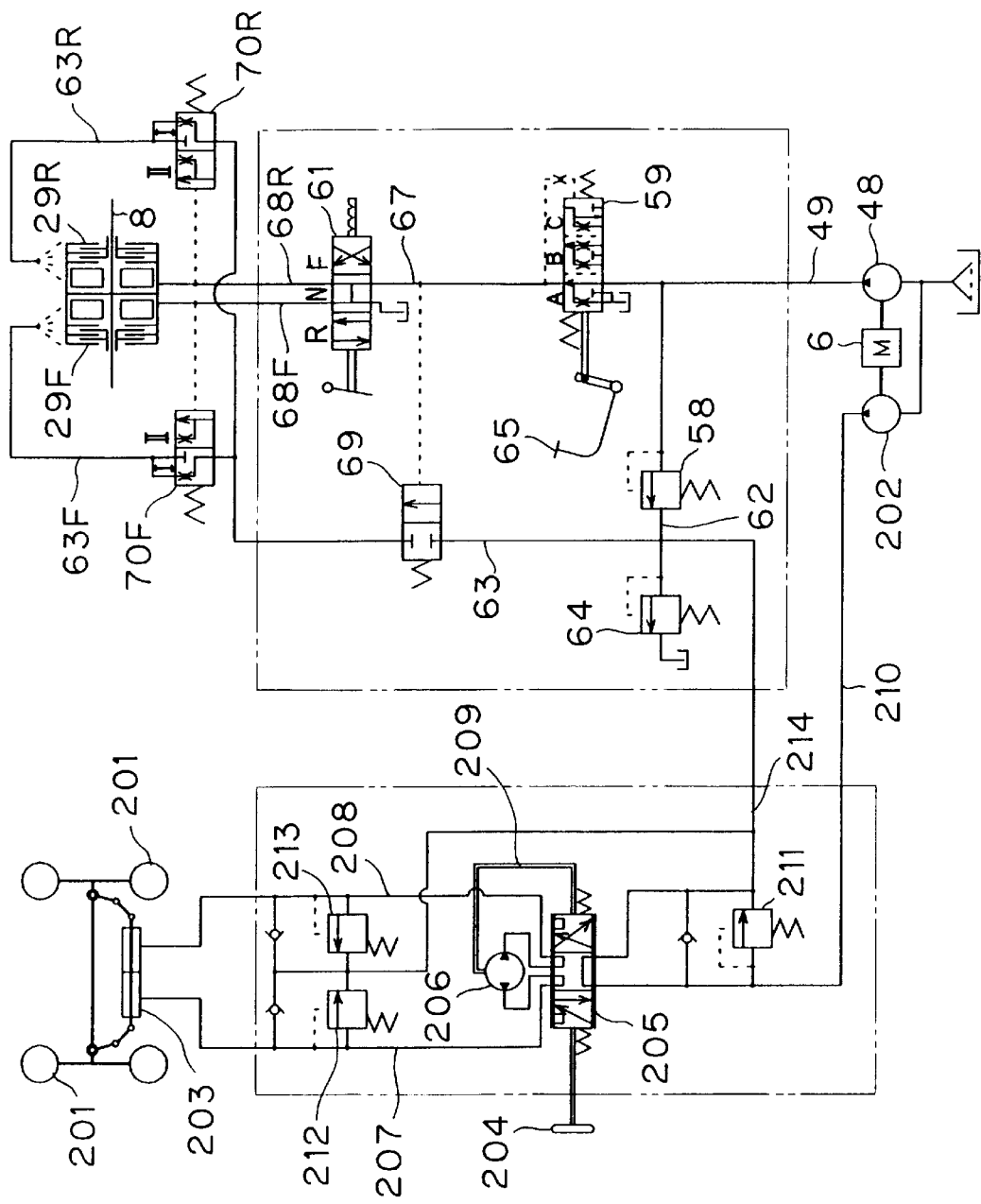

FLUID SUPPLY SYSTEM IN VEHICLES

FIELD OF THE INVENTION

This invention relates to a fluid supply system in a vehicle wherein a supplementary speed change mechanism having two fluid-operated clutchs, which are operated one at a time, and at least one main speed change mechanism having plural fluid-operated clutches, which are operated one at a time, are connected in series and wherein fluid pressure applied to one of the fluid-operated clutches of supplementary speed change mechanism under operation is once reduced automatically in response to the shifting operation of main speed change mechanism. The present invention also relates to a fluid supply system in a vehicle which comprises a supplementary speed change mechanism having two fluid-operated clutches which are operated one at a time, fluid pressure applied to one of the fluid-operated clutches under operation being selectively reduced so as to bring the clutch into a slippingly engaged condition and to thereby slow down the running speed of vehicle.

BACKGROUND OF THE INVENTION

A supplementary speed change mechanism having two fluid-operated clutches which are operated one at a time may be a direction-reversing mechanism or high/low speed-selecting mechanism, and such a supplementary speed change mechanism is set in advance before the running of vehicle in a condition where one of the fluid-operated clutches is selected for operation, so that selecting operation of the clutches is seldom performed during the running of vehicle. Contrary, a main speed change mechanism having plural fluid-operated clutches which are operated one at a time is frequently operated for shifting during the running of vehicle. In a structure in which a single hydraulic pump is used for supplying fluid to a supplementary speed change mechanism or fluid-operated clutches thereof and to a main speed change mechanism or fluid-operated clutches thereof, it is known from JP, A No. 1-199034 and from JP, A No. 8-20257 that fluid pressure applied to one of the fluid-operated clutches of supplementary speed change mechanism under operation is once reduced automatically in response to the shifting operation of main speed change mechanism so as to bring the clutch into a half-clutch condition. A fluid-operated clutch of the supplementary speed change mechanism in a half clutch condition will assure that a fluid-operated clutch of the main speed change mechanism to be newly engaged becomes operated substantially instantly without causing a shock so that a smooth speed transfer is achieved.

In the vehicle shown in JP, A No. 1-199034 wherein a direction-reversing mechanism having selectively operable two fluid-operated clutches and a main speed change mechanism having selectively operable plural fluid-operated clutches are connected in series, there is provided a pressure-unloading valve which is operable to once reduce fluid pressure in a fluid supply path connected to a directional control valve for the direction-reversing mechanism in response to the operation of directional control valve means for the main speed change mechanism. Lubrication of the two fluid-operated clutches of direction-reversing mechanism is performed by fluid relieved from a relief valve which determines fluid pressure applied to the clutches. In the vehicle shown in JP, A No. 8-20257 wherein a direction-reversing mechanism and a high/low speed-selecting mechanism each having two fluid-operated clutches are provided as supplementary speed change mechanisms and wherein these supplementary speed change mechanisms and a main speed change mechanisms having plural fluid-operated clutches are connected in series, electromagnetic proportional valves are incorporated respectively in fluid supply paths for the direction-reversing mechanism and for the high/low speed-selecting mechanism and any one of these electromagnetic proportional valves is once displaced in response to the operation of directional control valve means for the main speed change mechanism. Any reference is not made as to how the fluid-operated clutches of the direction-reversing mechanism and of the high/low speed-selecting mechanism are lubricated.

When lubricant is not supplied sufficiently to the fluid-operated clutches of a supplementary speed change mechanism which are reduced in fluid pressure applied thereto for a half clutch or slippingly engaged condition every time when the shifting operation of a main speed change mechanism is performed, seizing of the fluid-operated clutches is easily caused so that durability of the clutches is damaged.

Sufficient lubrication of the fluid-operated clutches of a supplementary speed change mechanism is also desirable in a structure wherein a selectively operable pressure-reducing valve is incorporated in a fluid supply path to the fluid-operated clutches for selectively reducing fluid pressure applied to one of the clutches under operation so as to bring the clutch into a slippingly engaged condition and to thereby slow down the running speed of vehicle.

A primary object of the present invention is to provide a novel fluid supply system which sufficiently supplies lubricant to the fluid-operated clutches of a supplementary speed change mechanism which are reduced in fluid pressure applied thereto for a half clutch or slippingly engaged condition every time when the shifting operation of a main speed change mechanism is performed.

Another object of the invention is to provide a novel fluid supply system which assures a substantially instant operation or engagement of the fluid-operated clutch to be newly engaged in a main speed change mechanism so as to attain a smooth speed transfer.

Another primary object of the present invention is to provide a novel fluid supply system which sufficiently supplies lubricant to the fluid-operated clutches of a supplementary speed change mechanism which are reduced in fluid pressure applied thereto by the selective operation of a pressure-reducing valve incorporated in a fluid supply path to the fluid-operated clutches for a selective speed-reducing purpose of the vehicle.

SUMMARY OF THE INVENTION

The present invention relates to a fluid supply system in a vehicle wherein a supplementary speed change mechanism (12; 112) having two fluid-operated clutches (29F, 29R; 129L, 129H), which are operated selectively one at a time, and at least one main speed change mechanism (15; 18) having plural fluid-operated clutches (36, 37, 38; 45, 46, 47), which are operated selectively one at a time, are connected in series and wherein fluid pressure applied to one of the fluid-operated clutches of the supplementary speed change mechanism (12; 112) under operation is once reduced automatically in response to the shifting operation of the main speed change mechanism (15; 18). According to the present invention, the fluid supply system comprises: a flow control valve (50) which is connected to an output flow path (49) of a hydraulic pump (48) and which is operable to divide its inflow into a constant flow flowing out through a constant flow path (51) and a surplus flow flowing out through a surplus flow path (53), and a flow divider valve (52; 52A) which is connected to the constant flow path (51) and which is operable to divide its inflow into two divided flows of a constant ratio, one of the two divided flows flowing out through a first branch path (54) and the other of the two divided flows flowing out through a second branch path (55). The fluid-operated clutches (36, 37, 38; 45, 46, 47) of the main speed change mechanism (15; 18) is adapted to be supplied with operating fluid through the first branch path (54), the fluid-operated clutches (29F, 29R; 129L, 129H) of the supplementary speed change mechanism (12; 112) is adapted to be supplied with operating fluid through the second branch path (55), and the fluid-operated clutches (29F, 29R; 129L, 129H) of the supplementary speed change mechanism (12; 112) is adapted to be supplied with lubricant through the surplus flow path (53).

Because the fluid-operated clutches of main speed change mechanism (15; 18) are supplied with operating fluid through the first branch path (54) of the flow divider valve (51) which divides the constant flow from the flow control valve (50), the flow quantity of operating fluid supplied to the clutches of main speed change mechanism is kept constant regardless of the rotational speed of engine. Because the fluid-operated clutches of supplementary speed change mechanism (12; 112) are supplied with lubricant through the surplus flow path (53) of the flow control valve so that the flow quantity of lubricant is always secured and is increased as the rotational speed of engine increases, the fluid-operated clutches of supplementary speed change mechanism are supplied with a sufficient quantity of lubricant so that, even though one of the clutches is once brought into a half clutch or slippingly engaged condition in response to the shifting operation of main speed change mechanism, the frictional elements of the clutches of supplementary speed change mechanism are effectively lubricated and cooled whereby seizing of the frictional elements is well avoided and durability of the clutches is enhanced. With respect to the fluid-operated clutches of main speed change mechanism which are always supplied with operating fluid of a constant flow quantity, fluid pressure applied thereto after the shifting operation is not influenced even though fluid pressure applied to the fluid-operated clutches of supplementary speed change mechanism is once reduced in response to the shifting operation of main speed change mechanism, so that full operation of the clutches of main speed change mechanism is attained substantially instantly after the shifting operation. Thus, slipping operation of the clutches of main speed change mechanism, which leads to a loss in durability of the clutches, is substantially avoided and a smooth speed transfer is attained.

In a preferred embodiment of the present invention, there are provided two flow regulator valves (70F, 70R; 70L, 70H) which control respectively the flow of lubricant supplied to the two fluid-operated clutches (29F, 29R; 129L, 129H) of the supplementary speed change mechanism (12; 112) such that the flow of lubricant is throttled when these clutches are not operated whereas the flow of lubricant is increased when the clutches are operated, the flow regulator valves being adapted to be displaced respectively in response to the fluid pressure of operating fluid applied to the clutches.

The supplementary speed change mechanism may be at least one of a direction-reversing mechanism (12) and a high/low speed-selecting mechanism (112).

Preferably, there is provided an accumulator (71) which is connected to the first branch path (54). The accumulator is operable to maintain fluid pressure before the shifting operation of the main speed change mechanism almost same still after the shifting operation and to apply such fluid pressure to the fluid-operated clutches to be newly engaged. Thus, the accumulator enhances the effect that slipping operation of the clutches of main speed change mechanism is substantially avoided and a smooth speed transfer is attained.

According to a preferred embodiment of the present invention, the main speed change mechanism comprises a first fluid-operated speed change mechanism (15) and a second fluid-operated speed change mechanism (18) which are connected in series, each of the first and second fluid-operated speed change mechanisms being operative by the selective operation of one of plural fluid-operated clutches (36, 37, 38; 45, 46, 47). Further, directional control valve means for controlling the supply of operating fluid to the fluid-operated clutches (36, 37, 38, 45, 46, 47) of the first and second fluid-operated speed change mechanisms (15, 18) is composed of a plurality of two-position, four-port electromagnetic directional control valves (57A, 57B, 57C, 57D) each having no neutral position. According to this structure, speed change ratios obtainable by the main speed change mechanism are much increased because such change ratios are the product of the change ratios of first fluid-operated change mechanism and the change ratios of second fluid-operated change mechanism. A two-position, four-port electromagnetic directional control valve having no neutral position is available in the market with a low cost, and the use of a plurality of such electromagnetic valves will reduce the number of directional control valves as compared to the case where each of the fluid-operated clutches is associated with an electromagnetic directional control valve.

The present invention also relates to a fluid supply system in a vehicle which comprises: a supplementary speed change mechanism (12) having two fluid-operated clutches (29F, 29R) which are operated selectively one at a time, and another fluid-operated device (203, 206). According to the present invention, the fluid supply system comprises: a hydraulic pump (48) for supplying operating fluid to the fluid-operated clutches (29F, 29R) through a fluid supply path (49), a relief valve (58) for determining fluid pressure in the fluid supply path (49), a pressure-reducing valve (59) incorporated in the fluid supply path (49) for selectively reducing fluid pressure in the fluid supply path (49) and to thereby bring one of the fluid-operated clutches (29F, 29R) under operation into a slippingly engaged condition, another hydraulic pump (202) for supplying operating fluid to said another fluid-operated device (203, 206), a relief valve (211, 212, 213) for determining fluid pressure applied to said another fluid-operated device (203, 206), and a lubricant supply path (63) for supplying lubricant to the fluid-operated clutches (29F, 29R). The lubricant supply path (63) is adapted to be supplied with fluid relieved respectively from said relief valve (58) and from said another relief valve (211, 212, 213).

The pressure-reducing valve is selectively operated to bring one of the fluid-operated clutches under operation into a slippingly engaged condition and to thereby slow down the vehicle speed. The clutches which are selectively brought into a slippingly engaged condition are sufficiently lubricated by fluid relieved respectively from the relief valve (58) for determining fluid pressure applied to the clutches and from another relief valve (211, 212, 213) for determining fluid pressure applied to another fluid-operated device.

The above-referenced another fluid-operated device may be a power cylinder (203) and a hydraulic metering motor (206) which are provided in a power steering mechanism.

BRIEF DESCRIPTION OF THE DRAWINGS

The present invention and its attendant advantages will become more readily apparent as the specification is considered in conjunction with the accompanying drawings in which:

FIG. 7 is a circuit diagram showing a fluid circuit in a third embodiment of the present invention.

DESCRIPTION OF PREFERRED EMBODIMENTS

Figure 1:
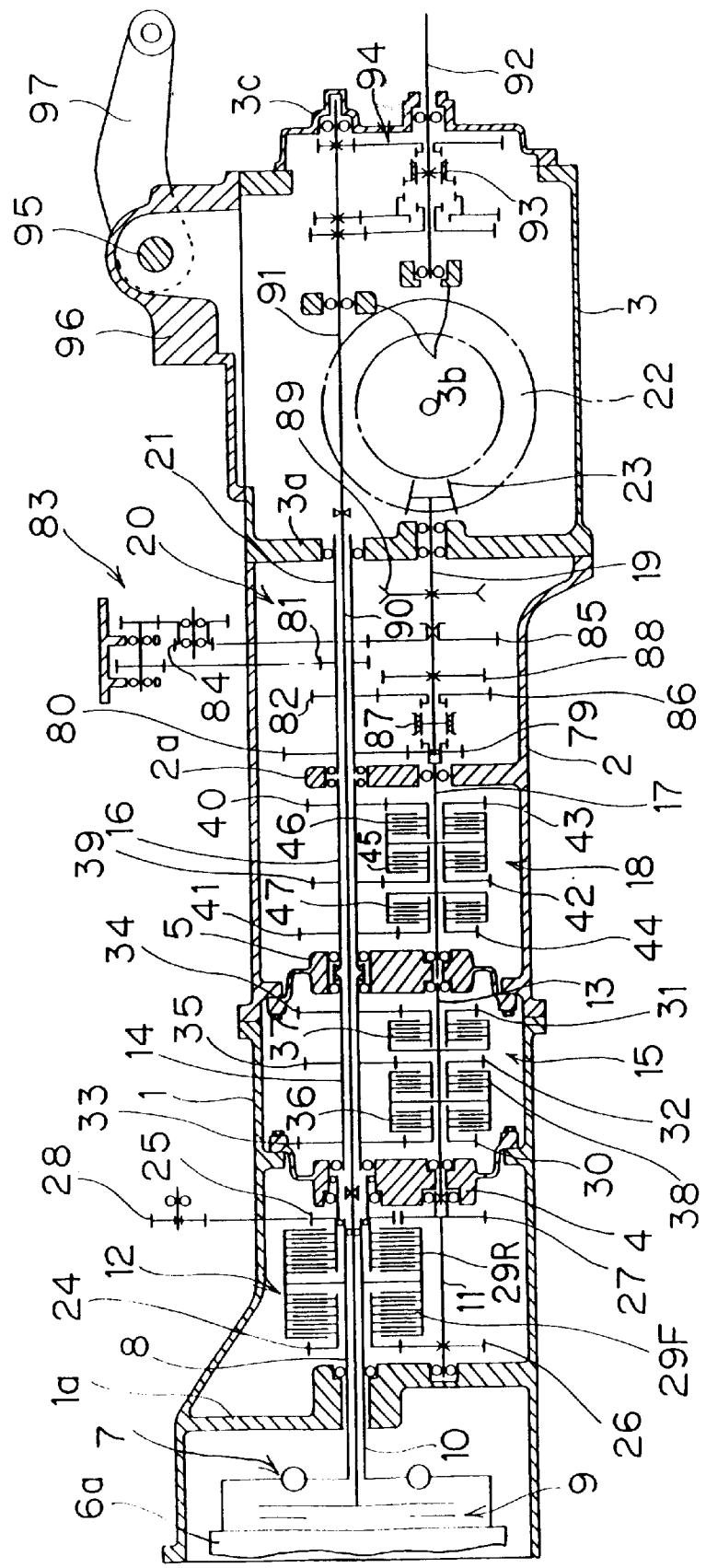
FIG. 1 is a diagram showing a transmission system of a tractor in which a first embodiment of the present invention is employed.

FIGS. 1 to 4 show a first embodiment, and FIG. 1 depicts a transmission system of a tractor in which the first embodiment is employed. The vehicle body of the tractor is composed of a front housing 1, a middle housing 2 and a rear housing 3 which are arranged in series in a longitudinal direction of the tractor and are fastened together. The front housing 1 includes an integral support wall 1a at a location near the frontmost end thereof and a first bearing support frame 4, which is attached to the front housing 1, at a middle portion thereof. The middle housing 2 includes a second bearing support frame 4, which is attached to the middle housing 2, at a frontmost end thereof and an integral support wall 2a at a middle portion thereof. The rear housing 3 includes a front wall 3a, a support wall 3b at a middle portion thereof and a rear cover 3c which closes a rear end opening. Within the front housing 1, a hollow primary drive shaft 8 of a drive transmission line is coupled directly to an engine flywheel 6a and a primary drive shaft 10 of a PTO (power take-off) transmission line is coupled to the flywheel 6a through a mechanical clutch 9.

The drive transmission line includes a direction-reversing mechanism 12 which is disposed within a front portion of the front housing 1 and between the primary drive shaft 8 and an output shaft 11 arranged below the primary drive shaft. The drive transmission line further includes a first fluid-operated speed change mechanism 15 and a second fluid-operated speed change mechanism 18 which are connected in series to each other. The first fluid-operated speed change mechanism 15 is disposed within a rear portion of the front housing 1 and between a first drive shaft 13, which is arranged co-axially with and is connected to the output shaft 11, and a hollow first driven shaft 14 which is arranged co-axially with the primary drive shaft 8. The second fluid-operated speed change mechanism 18 is disposed within a front portion of the middle housing 2 and between a hollow second drive shaft 16, which is arranged co-axially with and is connected to the first driven shaft 14, and a second driven shaft 17 which is arranged co-axially with the first drive shaft 13. Further, the drive transmission line includes a mechanical speed change mechanism 20 which is disposed within a rear portion of the middle housing 2 and between the second driven shaft 17 and a propeller shaft 19 which is arranged co-axially with the second driven shaft. The mechanical speed change mechanism 20 includes a hollow counter shaft 21 which is arranged co-axially with the second drive shaft 16. The propeller shaft 19 extends, at its rear end, into the rear housing 3 and has an integral bevel pinion 23 which is meshed with a larger input bevel gear 22 of a differential gearing for left and right rear wheels (both not shown in the drawings).

The direction-reversing mechanism 12 comprises two gears 24 and 25 which are rotatably mounted on the primary drive shaft 8, and two gears 26 and 27 which are fixedly mounted on the output shaft 11. Of these gears, forward directional gears 24 and 26 are meshed directly with each other and backward directional gears 25 and 27 are meshed through an idler gear 28 which is supported by the first bearing support frame 4. For coupling the gears 24 and 25 one at a time to the primary drive shaft 8, there are mounted on the primary drive shaft 8 a forward directional fluid-operated clutch 29F and a backward directional fluid-operated clutch 29R.

The first fluid-operated speed change mechanism 15 comprises three gears 30, 31 and 32 which are rotatably mounted on the first drive shaft 13, and three gears 33, 34 and 35 which are fixedly mounted on the first driven shaft 14 and are meshed respectively with the gears 30, 31 and 32. For coupling the gears 30, 31 and 32 one at a time to the first drive shaft 13, three fluid-operated clutches 36, 37 and 38 are mounted on the first drive shaft 13.

The second fluid-operated speed change mechanism 18 comprises three gears 39, 40 and 41 which are fixedly mounted on the second drive shaft 16, and three gears 42, 43 and 44 which are rotatably mounted on the second driven shaft 17 and are meshed respectively with the gears 39, 40 and 41. For coupling the gears 42, 43 and 44 one at a time to the second driven shaft 17, three fluid-operated clutches 45, 46 and 47 are mounted on the second driven shaft 17.

Of these direction-reversing mechanism 12 and first and second fluid-operated speed change mechanisms 15 and 18, the direction-reversing mechanism 12 functions as a supplementary speed change mechanism and the forward directional fluid-operated clutch 29F or the backward directional fluid-operated clutch 29F thereof is selected in advance before the running of vehicle so that the selecting operation of these clutches 29F or 29R is seldom performed during the running of vehicle. Contrary, the first and second fluid-operated speed change mechanisms 15 and 18 function respectively as a main speed change mechanism and the shifting operation of these change mechanisms 15 and 18 are frequently performed during the running of vehicle. A fluid circuit shown in FIG. 2 is provided for operating the fluid-operated clutches 29F and 29R of the direction-reversing mechanism 12 and for operating the fluid-operated clutches 36, 37, 38, 45, 46 and 47 of the first and second fluid-operated speed change mechanisms 15 and 18.

Figure 2:
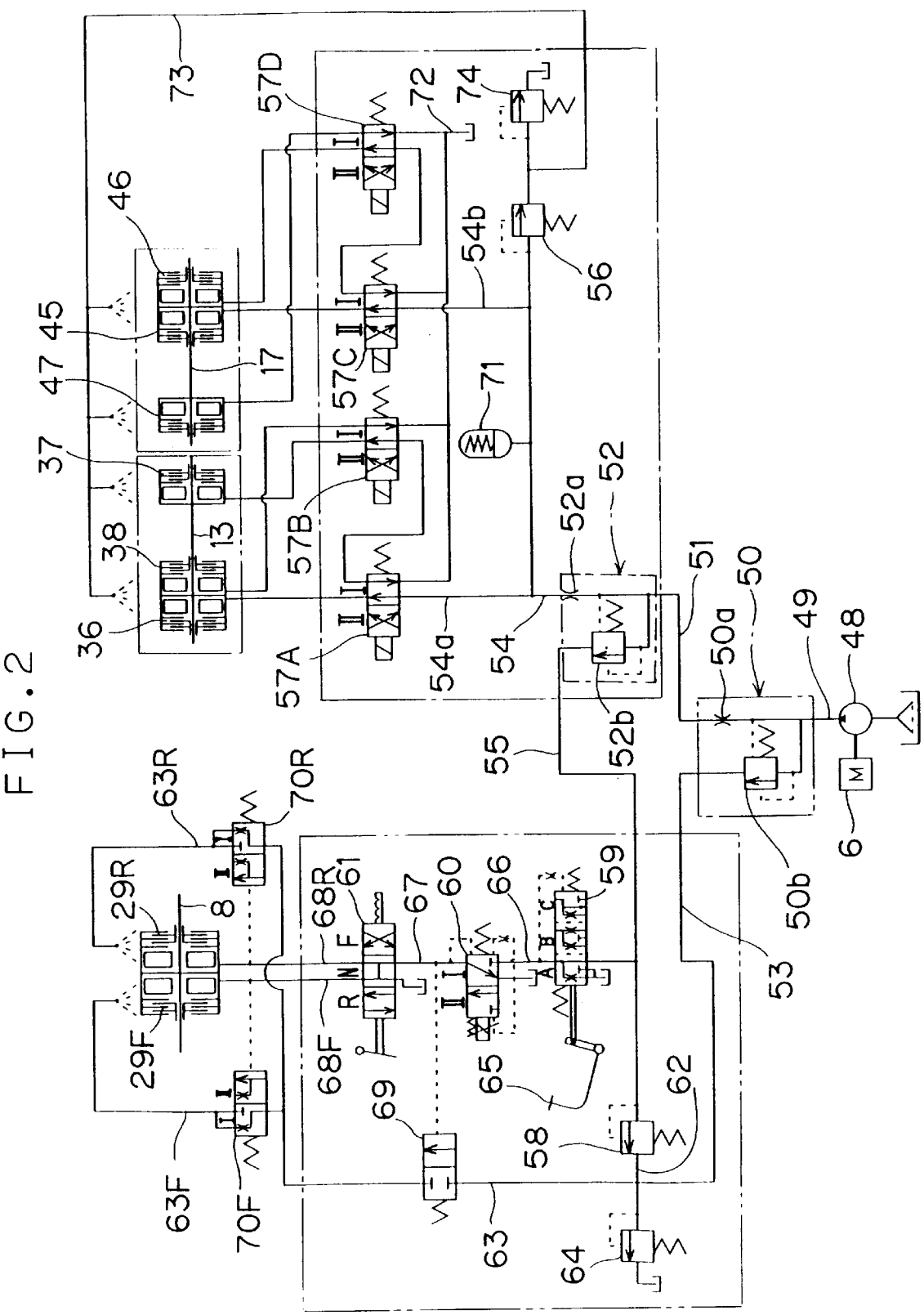
FIG. 2 is a circuit diagram showing a fluid circuit in the first embodiment.

As shown in FIG. 2, a flow control valve 50 is connected to an output path 49 of a hydraulic pump 48 which is driven by an engine 6. As is usual, the flow control valve 50 comprises a throttle 50a, which is incorporated in a constant flow path 51, and a relief valve 50b which is incorporated in a surplus flow path 53 and to which fluid pressure in an upstream side of the throttle 50a is applied as a back pressure. A flow divider valve 52 is connected to the constant flow path 51 of the flow control valve 50. The flow divider valve 52 employed in the first embodiment is of a flow control valve type comprising a throttle 52a, which is incorporated in a first branch path 54, and a relief valve 52b which is incorporated in a second branch path 55 and to which fluid pressure in a upstream side of the throttle 52a is applied as a back pressure.

Fluid pressure in the first branch path 54 is determined by a relief valve 56, and this branch path 54 is connected to the fluid-operated clutches 36, 37, 38, 45, 46 and 47 of the first and second fluid-operated speed change mechanisms 15 and 18 through electromagnetic directional control valves 57A, 57B, 57C and 57D so as to supply operating fluid to these fluid-operated clutches. Fluid pressure in the second branch path 55 is determined by a relief valve 58, and this branch path 55 is connected to the fluid-operated clutches 29F and 29R of the direction-reversing mechanism 12 through a pressure-reducing valve 59, through an electromagnetic proportional valve 60 which is adapted to automatically reduce fluid pressure in response to the shifting operation of the first and second fluid-operated speed change mechanisms 15 and 18, and through a directional control valve 61 so as to supply operating fluid to the clutches 29F and 29R. The surplus flow path 53 of the flow control valve 50 and a relief path 62 of the relief valve 58 are joined together as a lubricant supply path 63, and lubricant at a pressure determined by a relief valve 64 is supplied to the fluid-operated clutches 29F and 29R of the direction-reversing mechanism 12 through the lubricant supply path 63.

More specifically, the pressure-reducing valve 59 is adapted to be operated by a pedal 65 so as to reduce fluid pressure in its output path 66 and has a non-reducing position A in which the second branch path 55 is connected to the output path 66 without any substantial throttling, a pressure-reducing position B in which path connecting between the second branch path 55 and the output path 66 is variably throttled and a part of fluid is drained into an oil reservoir so that fluid pressure in the output path 66 is variably reduced, and a pressure-unloading position C in which the second branch path 55 is blocked and the output path 66 is connected to the oil reservoir so that fluid pressure in the output path 66 is unloaded. When the vehicle is to be started, the pedal 65 is depressed fully so as to once unload the fluid pressure applied to the fluid-operated clutch 29F or 29R and, then, the pedal 65 is gradually released so as to gradually return the reducing valve 59 to its non-reducing position A through the reducing position B whereby the vehicle is started in a shock-free manner.

The electromagnetic proportional valve 60 is adapted to reduce fluid pressure in its output path 67 in response to the operation of electromagnetic directional control valves 57A, 57B, 57C and 57D and has a position I in which fluid is drained from the output path 67, and another position II in which fluid is supplied from the output path 66 to the output path 67. When the directional control valves 57A, 57B, 57C and 57D are operated, the proportional valve 60 is repeatedly displaced between the positions I and II so as to reduce the fluid pressure in the output path 67 by a required degree and, then, is displaced to the position II so as to maintain the fluid pressure in the output path 67.

The directional control valve 61 is connected to the forward directional fluid-operated clutch 29F and to the backward directional fluid-operated clutch 29R through fluid paths 68F and 68R, respectively, and has a neutral position N in which both of the clutches 29F and 29R are disengaged, a forward directional operative position F in which the forward directional fluid-operated clutch 29F is engaged, and a backward directional operative position R in which the backward directional fluid-operated clutch 29R is engaged.

In the lubricant supply path 63, there is incorporated an on-off valve 69 which is displaced from a shut-off position to an open position by fluid pressure in the path 67 between the electromagnetic proportional valve 60 and the directional control valve 61. At a downstream side of this on-off valve 69, the lubricant supply path 63 is branched into a lubricant supply path 63F for the forward directional fluid-operated clutch 29F and a lubricant supply path 63R for the backward directional fluid-operated clutch 29R. In these lubricant supply paths 63F and 63R, there are incorporated, respectively, flow regulator valves 70F and 70R to which fluid pressure in the fluid paths 68F and 68R is applied respectively as a pilot pressure. Each of these flow regulator valves 70F and 70R has a throttling position I, where the lubricant supply paths 63F and 63R are throttled respectively, and an open position II where the valves 70F and 70R are displaced respectively by the fluid pressure in the fluid paths 63F and 63R so as to fully open the lubricant supply paths 63F and 63R.

An accumulator 71 is connected to the first branch path 54 of the flow divider valve 52. The first branch path 54 is branched into two fluid supply paths 54a and 54b. The fluid supply path 54a is connected to the fluid-operated clutches 36, 37 and 38 of the first fluid-operated speed change mechanism 15 through the electromagnetic directional control valves 57A and 57B, whereas the fluid supply path 54b is connected to the fluid-operated clutches 45, 46 and 47 of the second fluid-operated speed change mechanism 18 through the electromagnetic directional control valves 57C and 57D. There is provided a single drain path 72 to which the electromagnetic directional control valves 57A, 57B, 57C and 57D are connected. A lubricant supply path 73 is branched from a downstream side of the relief valve 56 for supplying lubricant to the fluid-operated clutches 36, 37, 38, 45, 46 and 47 at fluid pressure determined by a relief valve 74.

Each of the electromagnetic directional control valves 57A, 57B, 57C and 57D is composed of a four-port valve having two positions I and II and is displaced from the position I to the position II by the energization of a solenoid. The fluid supply path 54a is connected to the electromagnetic directional control valve 57A which is connected to the fluid-operated clutch 36 and to the electromagnetic directional control valve 57B which in turn is connected respectively to the fluid-operated clutches 37 and 38. Similarly, the fluid supply path 54b is connected to the electromagnetic directional control valve 57C which is connected to the fluid-operated clutch 45 and to the electromagnetic directional control valve 57D which in turn is connected respectively to the fluid-operated clutches 46 and 47. Table 1 shows the relationship between the positions of the electromagnetic directional control valves 57A, 57B, 57C and 57D and two fluid-operated cluches under operation of the clutches 36, 37 and 38 of the first fluid-operated speed change mechanism 15 and the clutches 45, 46 and 47 of the second fluid-operated speed change mechanism 18.

TABLE 1

| Positions of Control Valves | | | | Change Mechanism | Change Mechanism |
| --- | --- | --- | --- | --- | --- |
| 57A | 57B | 57C | 57D | 15 | 18 |
| I  | I  | I  | I  | Clutch 36 | Clutch 45 |
| I  | I  | II | I  |           | Clutch 46 |
| I  | I  | II | II |           | Clutch 47 |
| II | I  | I  | I  | Clutch 37 | Clutch 45 |
| II | I  | II | I  |           | Clutch 46 |
| II | I  | II | II |           | Clutch 47 |
| II | II | I  | I  | Clutch 38 | Clutch 45 |
| II | II | II | I  |           | Clutch 46 |
| II | II | II | II |           | Clutch 47 |

Figure 3:
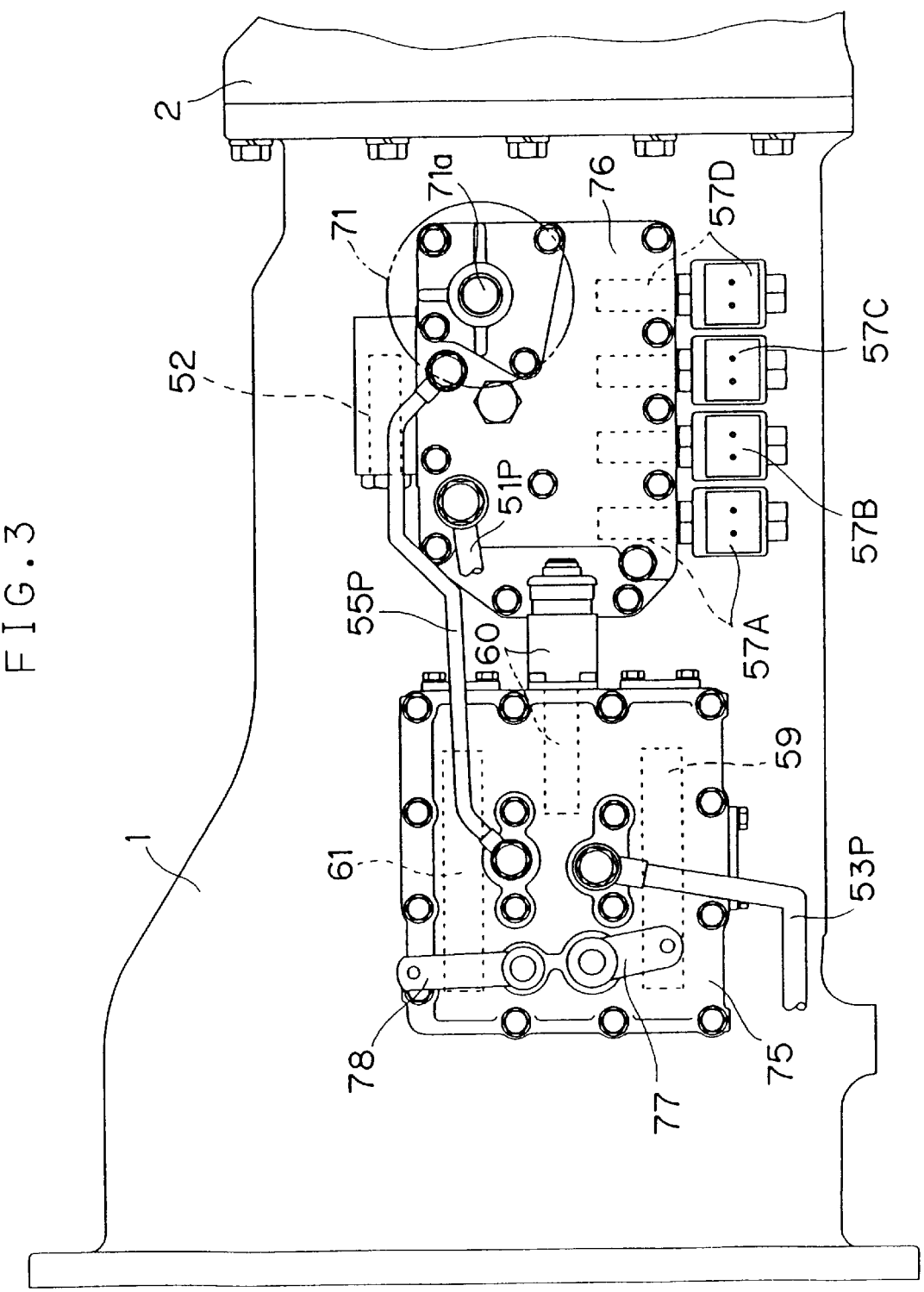
FIG. 3 is a side view of a front housing of the tractor.

FIG. 3 depicts an outer side surface of the front housing 1 on which there are fixedly mounted a valve case 75 for accomodating the valves for the direction-reversing mechanism 12 and another valve case 76 for accomodating the valves for the first and second fluid-operated change mechanisms 15 and 18. The valve case 75 includes in it the pressure-reducing valve 59, electromagnetic proportional valve 60 and directional control valve 61 successively from its lower portion. At locations outside the valve case 75, there are arranged an arm 77, which is connected to the pedal 65 for operating the reducing valve 59, and another arm 78 which is connected to a control lever (not shown) for operating the directional control valve 61. A pipe 53P, which corresponds to the surplus flow path 53, extends from the valve case 75. A pipe 51P corresponding to the control flow path 51 of flow control valve 50, which is not shown in FIG. 3, extends from the valve case 76. The flow divider valve 52 is arranged at an upper side of the valve case 76, whereas the electromagnetic directional control valves 57A, 57B, 57C and 57D are arranged at a lower side of the valve case 76. The accumulator 71 is arranged on an outer side surface of the valve case 76 and is threadingly secured to a threaded bore 71a which is formed in the valve case 76. A pipe 55P, which corresponds to the second branch path 55, extends from the valve case 76 to the valve case 75.

The transmission mechanism shown in FIG. 1 will be supplementarily described. The counter shaft 21 of mechanical speed change mechanism 20 is connected to the driven shaft 17 of second fluid-operated speed change mechanism 18 through reduction gears 79 and 80. Another two gears 81 and 82 are fixedly mounted on the counter shaft 21, and a gear 84 is arranged at an outside of the counter shaft 21 and is connected to the gear 81 through a reduction gearing 83. On the propeller shaft 19, a shifter gear 85, which can be meshed selectively with the gears 84 and 81, is slidably but non-rotatably mounted and a gear 86, which is meshed with the gear 82, is rotatably mounted. Further, there is mounted on the propeller shaft 19 a clutch 87 which is shiftable to a position, where it couples the gear 86 to the propeller shaft 19, and to another position where it couples the propeller shaft 19 directly to the driven shaft 17. Thus, the mechanical speed change mechanism 20 provides four speed change ratios, namely a first change ratio where the shifter gear 85 is meshed with the gear 84, second change ratio where the shifter gear 85 is meshed with the gear 81, third change ratio where the gear 86 is coupled to the propeller shaft 19 by the clutch 87, and fourth change ratio where the propeller shaft 19 is coupled to the driven shaft 17 by the clutch 87.

Further, there are fixedly mounted on the propeller shaft 19 a gear 88 for taking off driving power for front wheels, which are not shown in the drawings, and a pulley 89 to be braked by a parking brake which is also not shown in the drawings.

The primary drive shaft 10 of PTO drive transmission line is connected to a transmission shaft 90 which extends through the hollow driven shaft 14, drive shaft 16 and counter shaft 21. Another transmission shaft 91 is arranged within the rear housing 3 and is connected to the transmission shaft 90. A PTO shaft 92 extends outwardly of the vehicle body through the rear cover 3c of rear housing 3. Between the transmission shaft 91 and the PTO shaft 92, there is disposed a PTO speed change mechanism 94 which performs a speed change transmission of three change ratios by the selective operation of a clutch 93.

On an upper surface of the rear housing 3, there is mounted a hydraulic lift case 96 which rotatably supports a laterally extending lift arm shaft 95. The lift arm shaft 95 has, at its both ends, a pair of lift arms 97 for lifting and lowering an auxiliary implement not shown in the drawings.

Figure 4:
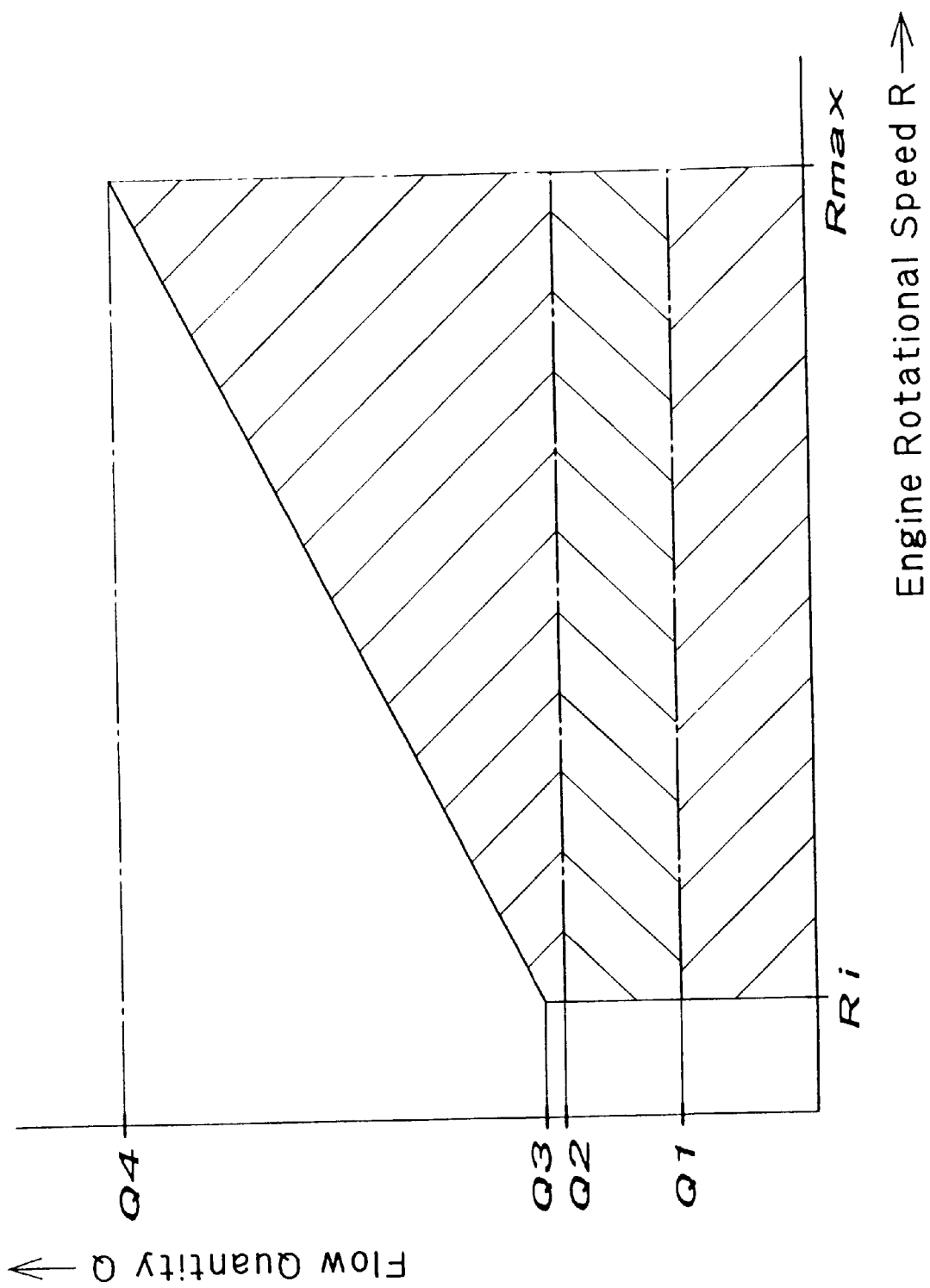
FIG. 4 is a schematic graph showing the relationship between the rotational speed of engine and the flow quantity discharged from a hydraulic pump.

FIG. 4 schematically shows the relationship between the rotational speed R of engine 6 and the flow quantity Q discharged from the pump 48. The flow quantity Q increases linearly from the quantity Q3 at the engine idling speed Ri to the quantity Q4 at the maximum speed of engine Rmax. As can be understood from FIG. 4, because a constant quantity flows through the constant flow path 51 of the flow control valve 50 and such constant flow quantity is divided by the flow dividing valve 52 into the first branch path 54 and into the second branch path 55 at a constant ratio, flow quantity Q1 flowing toward the fluid-operated clutches 36, 37, 38, 45, 46 and 47 of the first and second fluid-operated speed change mechanisms 15 and 18 and flow quantity Q2-Q1 flowing toward the fluid-operated clutches 29F and 29R of the direction-reversing mechanism 12 are kept constant, respectively, through the engine speeds from the idling speed Ri to the maximum speed Rmax. Flow quantity flowing through the surplus flow path 53 of the flow control valve 50, namely flow quantity supplied toward the fluid-operated clutches 29F and 29R of the direction-reversing mechanism 12 as lubricant, increases linearly from the flow quantity Q3-Q1-Q2 at the idling speed Ri to the flow quantity Q4-Q1-Q2 at the maximum speed Rmax.

Thus, while the flow quantity of operating fluid supplied toward the fluid-operated clutches 36, 37, 38, 45, 46 and 47 of the first and second fluid-operated speed change mechanisms 15 and 18 is kept constant regardless of the rotational speed of engine, the flow quantity of lubricant supplied toward the fluid-operated clutches 29F and 29R of the direction-reversing mechanism 12 is secured already at the engine idling speed and is increased as the rotational speed of engine increases. Consequently, even though the fluid pressure applied to the fluid-operated clutch 29F or 29R is reduced automatically by the electromagnetic proportional valve 60 in response to the operation of electromagnetic directional control valves 57A, 57B, 57C and 57C, lubricant is sufficiently supplied to such a fluid-operated clutch 29F or 29R which is in a slipplingly engaged condition because of the reduction in fluid pressure applied thereto, so that seizing of the clutch is well avoided. Such effect is enhanced by the presence of the flow regulator valves 70F and 70R which are operable to supply lubricant without throttling to only one fluid-operated clutch 29F or 29R under operation. Because the flow quantity of operating fluid supplied toward the fluid-operated clutches 36, 37, 38, 45, 46 and 47 of the first and second fluid-operated speed change mechanisms 15 and 18 is always kept constant, fluid pressure applied to these clutches after a shifting operation of the first and second speed change mechanisms 15 and 18 is not influenced even though fluid pressure applied to the fluid-operated clutch 29F or 29R is once reduced in response to the shifting operation of the first and second change mechanisms 15 and 18. Consequently, full engagement of the clutches 36, 37, 38, 45, 46 and 47 can be attained almost instantly after the shifting operation. This effect is enhanced because of the presence of the accumulator 71 since the accumulator is operable to maintain fluid pressure before the shifting operation almost same still after the shifting operation and to apply such pressure to the fluid-operated clutches to be newly engaged. Thus, the clutches are fully engaged instantly at the shifting operation so as not to interrupt the power transmission to thereby assure a smooth transfer of the vehicle speed.

Figure 5:
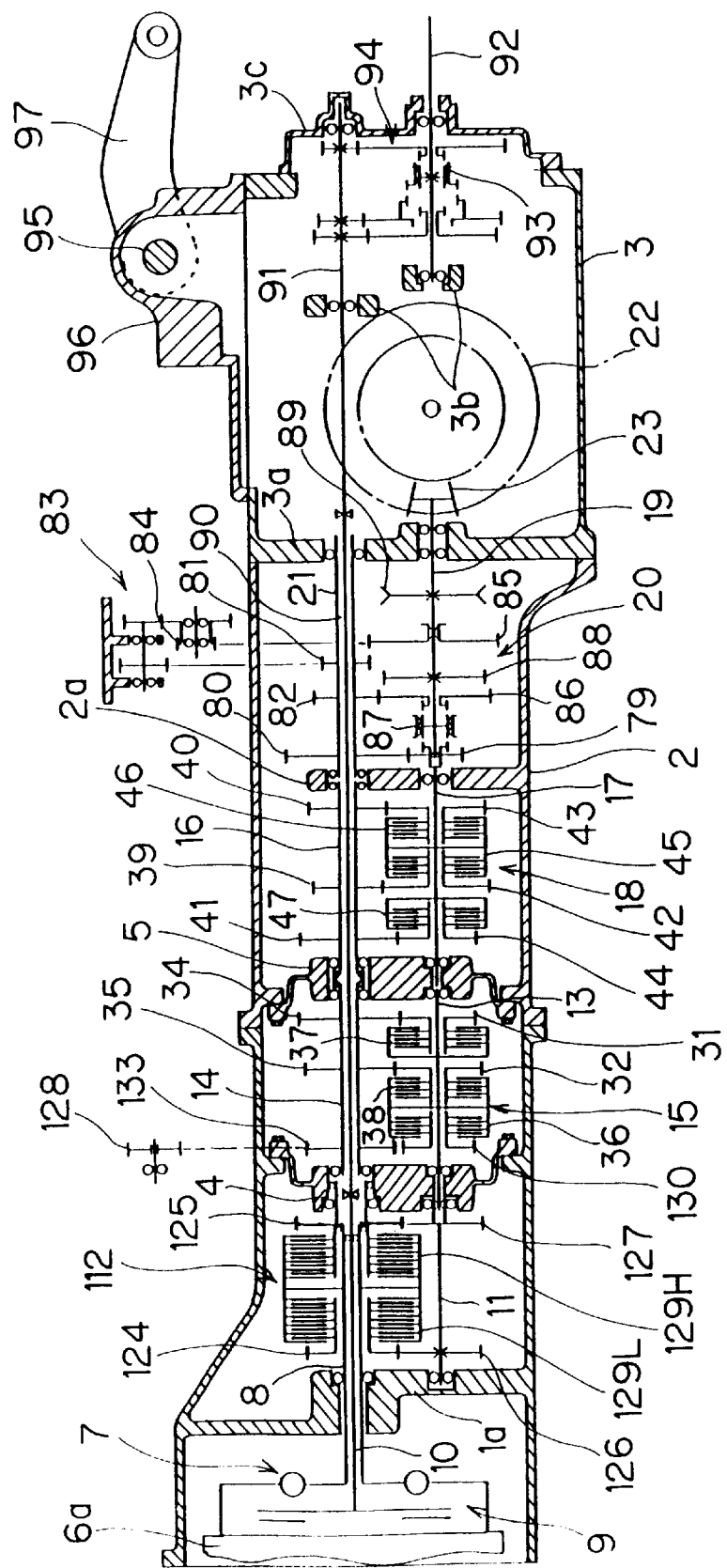
FIG. 5 is a diagram showing a transmission system of a tractor in which a second embodiment of the present invention is employed.
Figure 6:
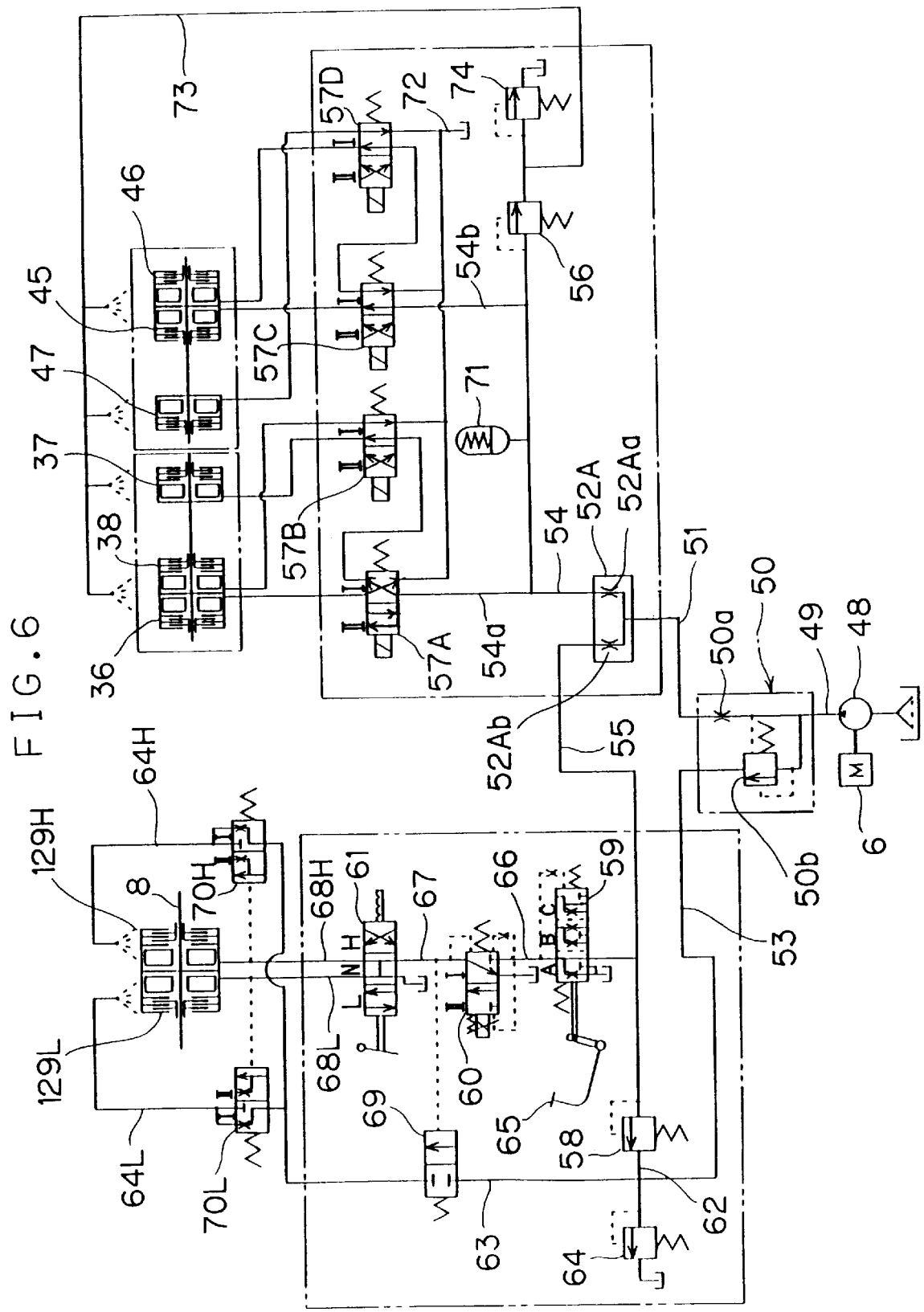
FIG. 6 is a circuit diagram showing a fluid circuit in the second embodiment.

FIGS. 5 and 6 show a second embodiment. As shown in FIG. 5, a high/low speed-selecting mechanism 112 is provided in the place of the direction-reversing mechanism 12 employed in the first embodiment. The high/low speed-selecting mechanism 112 comprises two gears 124 and 125 which are rotatably mounted on the primary drive shaft 8, and two gears 126 and 127 which are fixedly mounted on the output shaft 11 and are meshed directly with the gears 124 and 125. Gears 124 and 126 provide a low speed gear train, and gears 125 and 127 provide a high speed gear train. For coupling the gears 124 and 125 one at a time to the primary drive shaft 8, a low speed fluid-operated clutch 129L and a high speed fluid-operated clutch 129H are mounted on the primary drive shaft.

The first speed gear train of meshing gears 30 and 33 in the first fluid-operated speed change mechanism 15 employed in the first embodiment is replaced by a backward directional gear train comprising a gear 130 which is rotatably mounted on the first drive shaft 13, a gear 133 which is fixedly mounted on the first driven shaft 14, and an idler gear 128 which is supported by the first bearing support frame 4 and is meshed respectively with the gears 130 and 133. A fluid-operated clutch 36 is mounted on the first drive shaft 13 for coupling the gear 130 to this shaft. In the second embodiment, the gear train of meshing gears 31 and 34 acts as a forward directional first speed gear train and the gear train of meshing gears 32 and 35 acts as a forward directional second speed gear train.

As shown in FIG. 6, the flow divider valve 52 of a flow control valve type employed in the first embodiment is replaced by a proportional divider valve 52A which comprises a first throttle 52Aa incorporated in the first branch path 54 and a second throttle 52Ab incorporated in the second branch path 55. The proportinoal divider valve 52A is operable to divide its constant inflow coming from the flow control valve 50 into first and second proportional control flows, flowing out through the first and second branch paths 54 and 55, of a predetermined constant ratio. Thus, the operation of the proportional divider valve 52A is substantially the same as that of the divider valve 52 employed in the first embodiment. In the second embodiment, the forward directional first speed fluid-operated clutch 37 is supplied with operating fluid not through the electromagnetic directional control valve 57A but through the electromagnetic directional control valve 57B in a condition shown where any one of the solenoids of the electromagnetic directional control valves 57A, 57B, 57C and 57C is not energized. Thus, the vehicle will start at the lowest forward directional speed where the clutch 37 of first fluid-operated speed change mechanism 115 and the clutch 45 of second fluid-operated speed change mechanism 18 are respectively in an engaged condition.

Directional control valve 61 for the high/low speed-selecting mechanism 112 comprises a neutral position N, low speed position L and high speed position H and is connected to the fluid-operated clutches 129L and 129H respectively through paths 68L and 68H. Lubricant supply paths 64L and 64H include flow regulator valves 70L and 70H, respectively. The other parts of the second embodiment are structured similarly to the corresponding parts of the first embodiment.

As in the first embodiment, fluid pressure applied to the fluid-operated clutch 129L or 129H of high/low speed-selecting mechanism 112 is once reduced by the electromagnetic proportional valve 60 in response to the shifting operation of first and second fluid-operated speed change mechanisms 15 and 18 so that the clutch 129L or 129H is once brought into a slippingly engaged condition. In such a case, the fluid-operated clutch 129L or 129H in a slippingly engaged condition is sufficiently supplied with lubricant and the fluid-operated clutches to be newly engaged in the first and second fluid-operated speed change mechanisms 15 and 18 are operated substantially instantly, too.

Although the direction-reversing mechanism 12 or high/low speed-selecting mechanism 112 is provided in the above-referenced embodiments as a supplementary speed change mechanism, the present invention can also be carried out in a transmission in which both of a direction-reversing mechanism and a high/low speed-selecting mechanism are employed. Such two kinds of supplementary speed change mechanisms can be employed, for example, by providing a direction-reversing mechanism as in the first embodiment and by providing a high/low speed-selecting mechanism having two fluid-operated clutches in the place of the second fluid-operated speed change mechanism 18 employed in the first embodiment. The present invention can also be carried out in a transmission having such two kinds of supplementary speed change mechanisms in such a manner that lubricant is supplied to respective two fluid-operated clutches of the supplementary speed change mechanisms through a surplus flow path of a flow control valve.

FIG. 7 shows a third embodiment. In this embodiment, a direction-reversing mechanism 12 similar to the one shown in FIG. 1 is provided and fluid-operated clutches 29F and 29R of this reversing mechanism is adapted to be supplied with operating fluid by a hydraulic pump 48, as shown in FIG. 7. A flow control valve corresponding to the flow control valve 50 shown in FIG. 2 is not provided and the output path 49 of the pump 48 is used exclusively for supplying fluid toward the fluid-operated clutches 29F and 29R. For supplying fluid to the fluid-operated clutches 29F and 29R, a fluid supply circuit similar to the one shown in FIG. 2 is provided but an electromagnetic proportional valve corresponding to the valve 60 shown in FIG. 2 is eliminated. When the pressure-reducing valve 59 is displaced to its pressure-reducing position B during the running of vehicle whereby fluid pressure applied to the fluid-operated clutch 29F or 29R under operation is reduced, the clutch is brought into a slippingly engaged condition so as to slow down the vehicle speed.

In this embodiment, there is provided a power steering mechanism for steering the vehicle by turning left and right front wheels 201. For supplying operating fluid to the power steering mechanism, another hydraulic pump 202 is provided and is adapted to be driven by the engine 6. The power steering mechanism is of a conventional type comprising a power cylinder 203 for turning the left and right wheels 201 into one and the other directions, a three-position directional control valve 205 which is displaced by a steering wheel 204, a hydraulic metering motor 206 which is driven to rotate into one or the other direction when the directional control valve 205 is displaced from the neutral position shown to each operative position, a pair of fluid paths 207 and 208 for connecting one and the other ports of the motor 206 to one and the other fluid chambers of the power cylinder 203 through the directional control valve 205, and a feedback means 209 for connecting between the metering motor 206 and the directional control valve 205 so as to automatically return the directional control valve 205 to its neutral position when the power cylinder 203 has been operated by an amount corresponding to the angle of revolution of the steering wheel 204.

A relief valve 211 is incorporated in a branch path branched from an output path 210 of the hydraulic pump 202 for establishing or determining fluid pressure applied to the hydraulic metering motor 206, whereas relief valves 212 and 213 are incorporated respectively in branch paths branched from the pair of paths 207 and 208 for establishing or determining fluid pressure applied to one and the other fluid chambers of the power cylinder 203. The above-referenced branch paths are joined together to a path 214. This path 214 is connected, together with the relief path 62 of relief valve 58, to the lubricant supply path 63 so as to supply fluid in the paths 62 and 214 toward the fluid-operated clutches 29F and 29R as lubricant at a pressure determined by the relief valve 64. Additionally, the directional control valve 205 is adapted to flow out, at the neutral position thereof, the whole of the output flow of hydraulic pump 202 into the path 214.

Consequently, the lubricant supply path 63 is supplied, in addition to the relieved fluid from the relief valve 58, with the whole of the output flow of pump 202 when the directional control valve 205 is placed in its neutral position, and with relieved fluid from the relief valves 211 and 212 or 213 when the directional control valve 205 is placed in each operative position thereof, so that the fluid-operated clutches 29F and 29R are sufficiently lubricated. Thus, even when the pressure-reducing valve 59 is displaced to its pressure-reducing position B and the fluid-operated clutch 29F or 29R is brought into a slippingly engaged condition so as to slow down the vehicle speed, the fluid-operated clutch 29F or 29R is sufficiently lubricated so that seizing of the clutch is not caused.

We claim:

1. In a vehicle wherein a supplementary speed change mechanism (12; 112) having two fluid-operated clutches (29F, 29R; 129L, 129H), which are operated selectively one at a time, and at least one main speed change mechanism (15; 18) having plural fluid-operated clutches (36, 37, 38; 45, 46, 47), which are operated selectively one at a time, are connected in series and wherein fluid pressure applied to one of said fluid-operated clutches of said supplementary speed change mechanism (12; 112) under operation is once reduced automatically in response to the shifting operation of said main speed change mechanism (15; 18), a fluid supply system which comprises:

a flow control valve (50) which is connected to an output flow path (49) of a hydraulic pump (48) and which is operable to divide its inflow into a constant flow flowing out through a constant flow path (51) and a surplus flow flowing out through a surplus flow path (53); and a flow divider valve (52; 52A) which is connected to said constant flow path (51) and which is operable to divide its inflow into two divided flows of a constant ratio, one of said two divided flows flowing out through a first branch path (54) and the other of said two divided flows flowing out through a second branch path (55);

said fluid-operated clutches (36, 37, 38; 45, 46, 47) of said main speed change mechanism (15; 18) being adapted to be supplied with operating fluid through said first branch path (54), said fluid-operated clutches (29F, 29R; 129L, 129H) of said supplementary speed change mechanism (12; 112) being adapted to be supplied with operating fluid through said second branch path (55), and said fluid-operated clutches (29F, 29R; 129L, 129H) of said supplementary speed change mechanism (12; 112) being adapted to be supplied with lubricant through said surplus flow path (53).

2. The fluid supply system as set forth in claim 1 further comprising two flow regulator valves (70F, 70R; 70L, 70H) which control respectively the flow of lubricant supplied to said two fluid-operated clutches (29F, 29R; 129L, 129H) of said supplementary speed change mechanism (12; 112) such that the flow of lubricant is throttled when the said clutches are not operated whereas the flow of lubricant is increased when the said clutches are operated, said flow regulator valves being adapted to be displaced respectively in response to the fluid pressure of operating fluid applied to the said clutches.

3. The fluid supply system as set forth in claim 1, wherein said supplementary speed change mechanism is at least one of a direction-reversing mechanism (12) and a high/low speed-selecting mechanism (112).

4. The fluid supply system as set forth in claim 1 further comprising an accumulator (71) which is connected to said first branch path (54).

5. The fluid supply system as set forth in claim 1, wherein said main speed change mechanism comprises a first fluid-operated speed change mechanism (15) and a second fluid-operated speed change mechanism (18) which are connected in series, each of said first and second fluid-operated speed change mechanisms being operative by the selective operation of one of plural fluid-operated clutches (36, 37, 38; 45, 46, 47), and wherein directional control valve means for controlling the supply of operating fluid to said fluid-operated clutches (36, 37, 38; 45, 46, 47) of said first and second fluid-operated speed change mechanisms (15, 18) is composed of a plurality of two-position, four-port electromagnetic directional control valves (57A, 57B, 57C, 57D) each having no neutral position.

6. In a vehicle comprising: a supplementary speed change mechanism (12) having two fluid-operated clutches (29F, 29R) which are operated selectively one at a time, and another fluid-operated device (203, 206), a fluid supply system which comprises:

a hydraulic pump (48) for supplying operating fluid to said fluid-operated clutches (29F, 29R) through a fluid supply path (49);

a relief valve (58) for determining fluid pressure in said fluid supply path (49);

a pressure-reducing valve (59) incorporated in said fluid supply path (49) for selectively reducing fluid pressure in said fluid supply path (49) and to thereby bring one of said fluid-operated clutches (29F, 29R) under operation into a slippingly engaged condition;

another hydraulic pump (202) for supplying operating fluid to said another fluid-operated device (203, 206);

another relief valve (211, 212, 213) for determining fluid pressure applied to said another fluid-operated device (203, 206); and a lubricant supply path (63) for supplying lubricant to said fluid-operated clutches (29F, 29R), said lubricant supply path (63) being adapted to be supplied with fluid relieved respectively from said relief valve (58) and from said another relief valve (211, 212, 213).

7. The fluid supply system as set forth in claim 6, wherein said supplementary speed change mechanism is a direction-reversing mechanism (12).

8. The fluid supply system as set forth in claim 6, wherein said another fluid-operated device comprises a power cylinder (203) and a hydraulic metering motor (206) which are provided in a power steering mechanism.

* * * * *